United States Patent
Keramidas et al.

(10) Patent No.: US 11,107,180 B2
(45) Date of Patent: Aug. 31, 2021

(54) ASYMMETRIC MULTI-CORE HETEROGENEOUS PARALLEL PROCESSING SYSTEM WITH CONTENT AWARE AND DISPLAY AWARE RENDERING LOGIC

(71) Applicant: THINK SILICON SA, Patras (GR)

(72) Inventors: Georgios Keramidas, Patras (GR); Iakovos Stamoulis, Patras (GR); George Sidiropoulos, Patras (GR)

(73) Assignee: Think Silicon SA, Patras (GR)

( * ) Notice: Subject to any disclaimer, the term of this patent is extended or adjusted under 35 U.S.C. 154(b) by 0 days.

(21) Appl. No.: 16/515,172

(22) Filed: Jul. 18, 2019

(65) Prior Publication Data

US 2019/0347758 A1    Nov. 14, 2019

Related U.S. Application Data (63) Continuation-in-part of application No. 15/687,776, filed on Aug. 28, 2017, now Pat. No. 10,510,133.

(60) Provisional application No. 62/786,379, filed on Dec. 29, 2018, provisional application No. 62/522,172, filed on Jun. 20, 2017.

(51) Int. Cl.
  *G06T 1/20* (2006.01)
  *G06F 15/80* (2006.01)
  *G06F 9/50* (2006.01)

(52) U.S. Cl.
  CPC .......... *G06T 1/20* (2013.01); *G06F 15/80* (2013.01)

(58) Field of Classification Search
  None
  See application file for complete search history.

(56) References Cited

U.S. PATENT DOCUMENTS

| | | | |
|---|---|---|---|
| 8,762,602 B2 | 6/2014 | Feng et al. | |
| 9,087,161 B1 | 7/2015 | Diamond | |
| 9,342,477 B2 | 5/2016 | Yap et al. | |
| 2002/0133593 A1 | 9/2002 | Johnson et al. | |
| 2002/0158865 A1 | 10/2002 | Dye et al. | |
| 2007/0153023 A1* | 7/2007 | Chladny | G06T 15/20 345/611 |
| 2008/0276220 A1* | 11/2008 | Munshi | G06F 9/5027 717/119 |
| 2009/0295816 A1 | 12/2009 | Kallio | |

(Continued)

OTHER PUBLICATIONS

Introduction to Deep Learning with TensorFlow (downloaded @https://web.archive.org/web/20170520093229/https://pythonprogramming.net/tensorflow-introduction-machine-learning-tutorial/(Year: 2017).*

API Documentation | TensorFlow (downloaded @https://web.archive.org/web/20170511031929/https://www.tensorflow.org/api_docs/ (Year: 2017).*

(Continued)

*Primary Examiner* — Yingchun He
(74) *Attorney, Agent, or Firm* — M&B IP Analysts, LLC (57) ABSTRACT

An asymmetric multi-core heterogenous parallel processing system includes a first group of graphic processor units (GPUs) and a second group of GPUs. The first and second groups of GPU cores share an instruction set architecture (ISA) such that the first group of GPU cores is capable of executing a portion of the instructions of the ISA, and the second group of GPU cores is capable of executing the entire instruction set of the ISA. An application is capable of utilizing both groups of GPU cores, and is further capable of determining what objects should be rendered on which group of GPU cores.

18 Claims, 7 Drawing Sheets

(56) References Cited

U.S. PATENT DOCUMENTS

| | | | |
|---|---|---|---|
| 2009/0322746 A1* | 12/2009 | Loop | G06T 15/405 |
| | | | 345/422 |
| 2012/0038642 A1* | 2/2012 | Wei | G01V 1/34 |
| | | | 345/424 |
| 2013/0314425 A1 | 11/2013 | Hum et al. | |
| 2014/0298060 A1 | 10/2014 | Hooker et al. | |
| 2015/0279090 A1* | 10/2015 | Keramidas | G06T 15/503 |
| | | | 345/505 |
| 2017/0243319 A1* | 8/2017 | Wittenbrink | G02B 27/0093 |
| 2018/0061122 A1* | 3/2018 | Clarberg | G06T 1/20 |
| 2018/0285158 A1* | 10/2018 | Appu | G06F 1/329 |
| 2018/0365792 A1 | 12/2018 | Keramidas et al. | |

OTHER PUBLICATIONS

Notice of Allowance for U.S. Appl. No. 15/687,776, dated Sep. 9, 2019.

Menard, Daniel et al. "Floating-to-Fixed-Point Conversion for Digital Signal Processors" Hindawi Publishing Corporation; EURASIP Journal on Applied Signal Processing; vol. 2006, pp. 1-19; Accepted Jul. 12, 2005.

Smith, Daniel M. et al, "Asymmetric Multiprocessing for Simultaneous Multithreading Processors" North Carolina State University, 2006.

Wilt, Nicholas "GPU Programming and Streaming Multiprocessors" 8.3 Floating-Point Support; informIT; Aug. 6, 2013.

Office Action for U.S. Appl. No. 15/687,776, dated Oct. 29, 2018.

Office Action for U.S. Appl. No. 15/687,776, dated May 10, 2019.

\* cited by examiner

ASYMMETRIC MULTI-CORE HETEROGENEOUS PARALLEL PROCESSING SYSTEM WITH CONTENT AWARE AND DISPLAY AWARE RENDERING LOGIC

CROSS-REFERENCE TO RELATED APPLICATIONS

This application claims the benefit of and, under 35 U.S.C. § 119(e), priority to, U.S. Provisional Patent Application No. 62/786,379, filed Dec. 29, 2018, entitled "An Asymmetric Multi-Core Heterogeneous Parallel Processing System with Content Aware and Display Aware Rendering Logic," which is incorporated herein by reference in its entirety.

This application is also a Continuation-in-Part of U.S. patent application Ser. No. 15/687,776, filed Aug. 28, 2017, entitled "Asymmetric Multi-Core Heterogeneous Parallel Processing System," which claims the benefit of and, under 35 U.S.C. § 119(e), priority to, U.S. Provisional Patent Application No. 62/522,172, filed Jun. 20, 2017, entitled "An Asymmetric Multi-Core Heterogeneous Parallel Processing System," each of which are incorporated herein by reference in their entirety

TECHNICAL FIELD

The disclosure generally relates to graphic processor units and particularly to multi-core graphic processor units.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

Many devices, such as internet of things devices, today include a display unit. For many of these, the largest power consumption is due to the display, and associated processors. Optimizing the processors may allow smaller power consumption, or performing additional tasks utilizing the same power consumption. Processor architectures are typically optimized for certain tasks, while possibly falling short in others.

Some applications include the use of asymmetrical processors, such as the art described in U.S. Pat. No. 9,087,161 "Asymmetrical scaling multiple GPU graphics system for implementing cooperative graphics instruction execution", to Diamond. As best understood, Diamond describes using multiple graphic processor units (GPUs) which are asymmetrical (different in their rendering capability), for scaling rendering capabilities to a computer system. Such a system is complex, and may require an overhead for each GPU of generating an instruction set corresponding to the workload of the specific GPU, which may only run on the same.

It would therefore be beneficial to improve upon the prior art, and provide a graphics rendering processor more efficient in power consumption, memory usage, or both.

BRIEF DESCRIPTION OF THE DRAWINGS

The subject matter of the disclosure is particularly pointed out and distinctly claimed in the claims at the conclusion of the specification. The foregoing and other objects, features, and advantages will be apparent from the following detailed description taken in conjunction with the accompanying drawings, of which:

DETAILED DESCRIPTION

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

A multi-core asymmetric graphics processing unit (GPU) includes a first group and second group of GPU cores. The first group of GPU cores have a first microarchitecture and a first power consumption profile. The first group of GPU cores is configured to execute a subset of instructions of an instruction set architecture (ISA). The second group of GPU cores has a second microarchitecture and a second power consumption profile higher than the first power consumption profile, and are configured to execute the entire ISA. The first group and second group of GPU cores may be further differentiated by number of pipeline stages, number of registers, branching execution, vectorization, capacity to execute instructions in parallel, multi-threading capabilities, or combinations thereof. A subset of GPU cores in either group may have a different operation frequency. In some embodiments, an executable instruction may include an indicator to ascertain if execution is performed by the first or second group of GPU cores.

The embodiments discussed herein refer to primary GPUs and secondary GPUs. It should be understood that in certain embodiments, the primary GPUs may be all implemented on a single die, or the secondary GPUs may be all implemented on another die, or the primary GPUs and the secondary GPUs may all be implemented on a single die, all without departing from the scope of the disclosure.

It should be readily understood that in certain embodiments a plurality of GPU groups may be utilized. Typically each group of GPU cores may have a different microarchitecture, as explained in more detail below.

Figure 1:
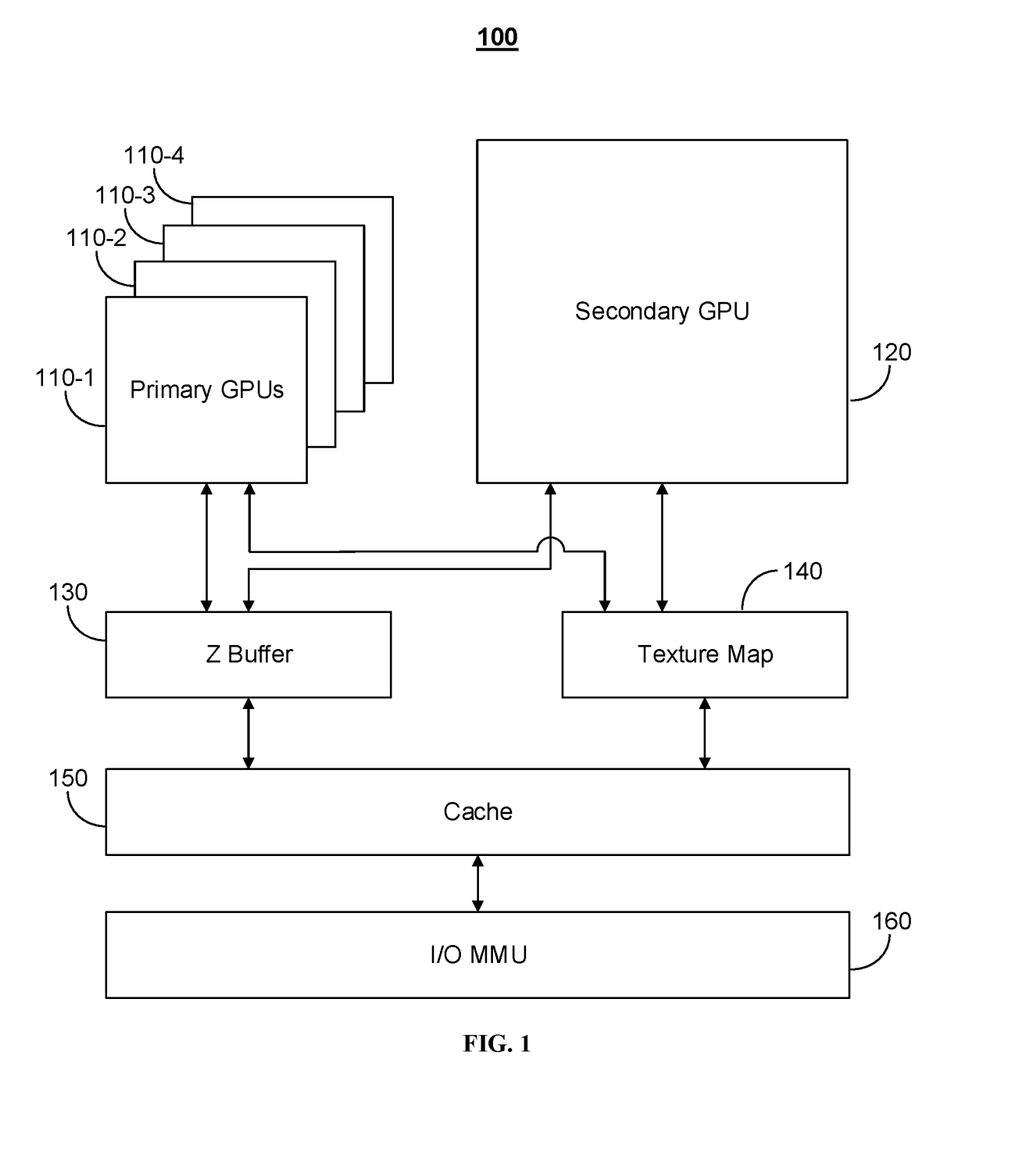
FIG. 1 is a schematic illustration of an asymmetric multi-core heterogeneous parallel processing system (HPPS), implemented in accordance with an embodiment.

FIG. 1 is an exemplary and non-limiting schematic illustration of an asymmetric multi-core heterogeneous parallel processing system 100, implemented in accordance with an embodiment. The multi-core heterogeneous parallel processing system (HPPS) 100 includes a first group of homogeneous primary graphic processor units (GPUs) 110-1 through 110-4, generally referenced as first group of primary GPUs 110, and a secondary GPU 120. In some embodiments, the HPPS is implemented as a multi-core, multi-processor unit. The first group of GPUs 110 may include one or more primary GPUs, each having a first microarchitecture and a first power consumption profile. A primary GPU 110 may have a fixed point data path, and a first set of instructions of an instruction set architecture (ISA). In an embodiment, the secondary GPU 120 may include one or more homogeneous secondary GPUs, each having a second microarchitecture and a second power consumption profile. The second power consumption profile is higher than the first power consumption profile, indicating that a GPU of the secondary group consumes more power than a GPU of the primary group. In this embodiment one secondary GPU is shown for sake of simplicity, however more than one could be present. A secondary GPU may have a floating point data path, and a second set of instructions of the ISA. In another embodiment the secondary GPU may have a fixed point data path of higher precision compared to the fixed point data path of a GPU core belonging to the primary GPU group. The second set may include all, or a portion of, the first set of instructions. In an embodiment, the second set may include an instruction set larger than the first set of instructions. The multi-core HPPS further includes a hardware z-buffer unit 130, coupled to the first group of primary GPUs 110 and the secondary GPU 120. Upon rendering an object, the depth of a generated pixel, equivalent to a z-coordinate, is generated by the z-buffer 130, and stored in memory. The z-Buffer logic may be implemented with different precision levels. For example, in an embodiment the z-Buffer operations for the primary GPUs might be based on M-bit computations and the z-Buffer operations for the second GPUs might be based on N-bit computations, where 'M' and 'N' are integer numbers having a value greater than '1', and 'M' is smaller than 'N'. In another embodiment, the z-buffer circuitry receives as input the requested precision level and this input may define the precision (i.e., number of bits) of the z-Buffer related computations. The multi-core HPPS further includes a texture mapping unit (TMU) 140. The TMU 140 may be a separate processing unit and may be used to transform a bitmap image to an arbitrary plane of a three-dimensional space. The TMU logic may be implemented with different precision levels, and with different sampling modes. For example, in an embodiment the TMU operations for the primary GPUs might be based on M-bit computations and the TMU operations for the second GPUs might be based on N-bit computations, where 'M' and 'N' are integer numbers having a value greater than '1', and 'M' is smaller than 'N'. In another embodiment, the TMU operations for the primary GPUs might be configured to perform point texture sampling and the TMU operations for the second GPUs might be configured to perform bilinear texture sampling. In yet another embodiment, the TMU circuitry might take as input the requested precision level (and this input might define the number of bits in the TMU related computations), or the texture sampling mode, or both. The TMU 140 and the z-buffer unit 130 are communicatively coupled to a cache 150. In certain embodiments, each GPU may have their own TMU, z-buffer unit, cache (or multiple cache levels), or any combination thereof. For example, each GPU (or group of GPUs, or subgroup of GPUs) may have their own TMU and z-buffer unit, but share a common cache. In another embodiment, each GPU (or group of GPUs, or subgroup of GPUs) may have their own TMU, and a common z-buffer unit and cache. The cache 150 is further communicatively coupled to an I/O memory management unit (MMU) 160. The I/O MMU 160 manages the cache, and may perform virtual memory management as needed. In the exemplary embodiment discussed above, the first group of GPUs and the second GPU are different in utilizing fixed point versus floating point or fixed point representations of different precisions. However, in other exemplary embodiments, the difference may be the number of registers, branching behavior, vectorization, pipeline stages, operation frequency, multi-threading capabilities, capacity to execute instructions in parallel, combinations thereof, and the like. In some embodiments, the first group of GPUs may be further divided into subgroups, where each subgroup may be further differentiated. For example, a first subgroup of the first group of GPUs may have a first operation frequency, and a second subgroup of the first group of GPUs may have a second operation frequency. In another example, the first subgroup has a cache of a first size (e.g., 1 kilobyte) and the second subgroup has a cache of a second size (e.g., 4 kilobytes).

Figure 2:
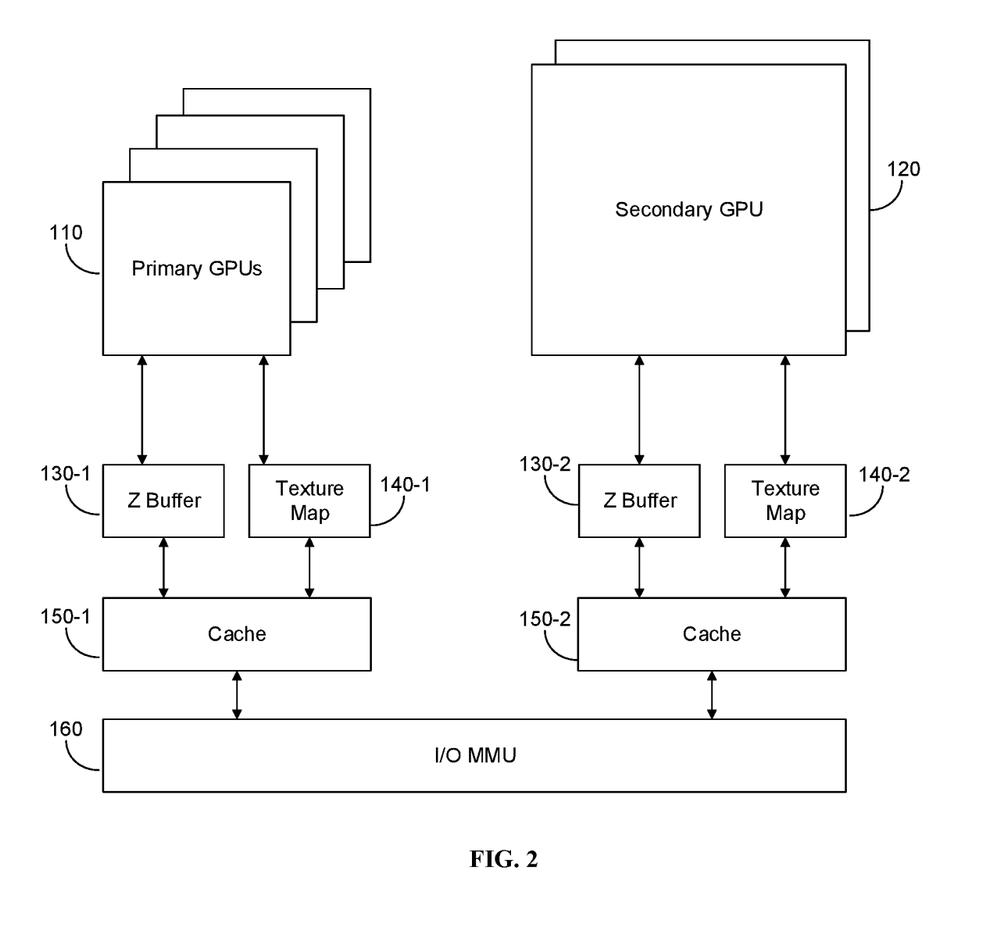
FIG. 2 is a schematic illustration of an asymmetric multi-core HPPS, implemented in accordance with another embodiment.

FIG. 2 is an exemplary and non-limiting schematic illustration of an asymmetric multi-core HPPS, implemented in accordance with another embodiment. The multi-core HPPS includes a first group of primary graphic processor units (GPUs), and a second group of secondary GPUs. The first group 110 may include a plurality of primary GPUs. A primary GPU may have a fixed point data path, and a first set of instructions of an instruction set architecture (ISA). The second group 120 may include a plurality of secondary GPUs. A secondary GPU may have a floating point data path or a fixed point data path of higher precision compared to the fixed point data path of primary GPUs, and a second set of instructions of the ISA. The second set may include all, or a portion of, the first set of instructions. In an embodiment, the second set may include an instruction set larger than the first set of instruction. The multi-core HPPS further includes a first hardware z-buffer 130-1, coupled to the first group of primary GPUs 110, and a second hardware z-buffer 130-2 coupled to the second group of secondary GPUs 120. Upon rendering an object, the depth of a generated pixel, equivalent to a z-coordinate, is stored in the z-buffer 130, which is explained in more detail with respect to FIG. 1 above. The multi-core HPPS further includes a first texture mapping unit (TMU) 140-1 coupled to the first group of primary GPUs 110, and a second TMU 140-2 coupled to the second group of secondary GPUs 120. Each TMU may be a separate processing unit, and may be used to transform a bitmap image to an arbitrary plane of a three-dimensional space, as described in more detail with respect to FIG. 1 above.

The first TMU 140-1 and the first z-buffer 130-1 are communicatively coupled to a first cache 150-1 or multiple levels of caches, and the second TMU 140-2 and the second z-buffer 130-2 are communicatively coupled to a second cache 150-2 or multiple levels of caches. Each of the caches 150-1 and 150-2 are further communicatively coupled to an I/O memory management unit (MMU) 160. The I/O MMU 160 manages each cache, and performs virtual memory management as needed. It is understood that in any embodiment described herein, the first group of primary GPUs may include one or more primary GPUs, and the second group of secondary GPUs may include one or more secondary GPUs. The exemplary embodiments are brought for pedagogical purposes and serve no limitation on the disclosure.

Figure 3:
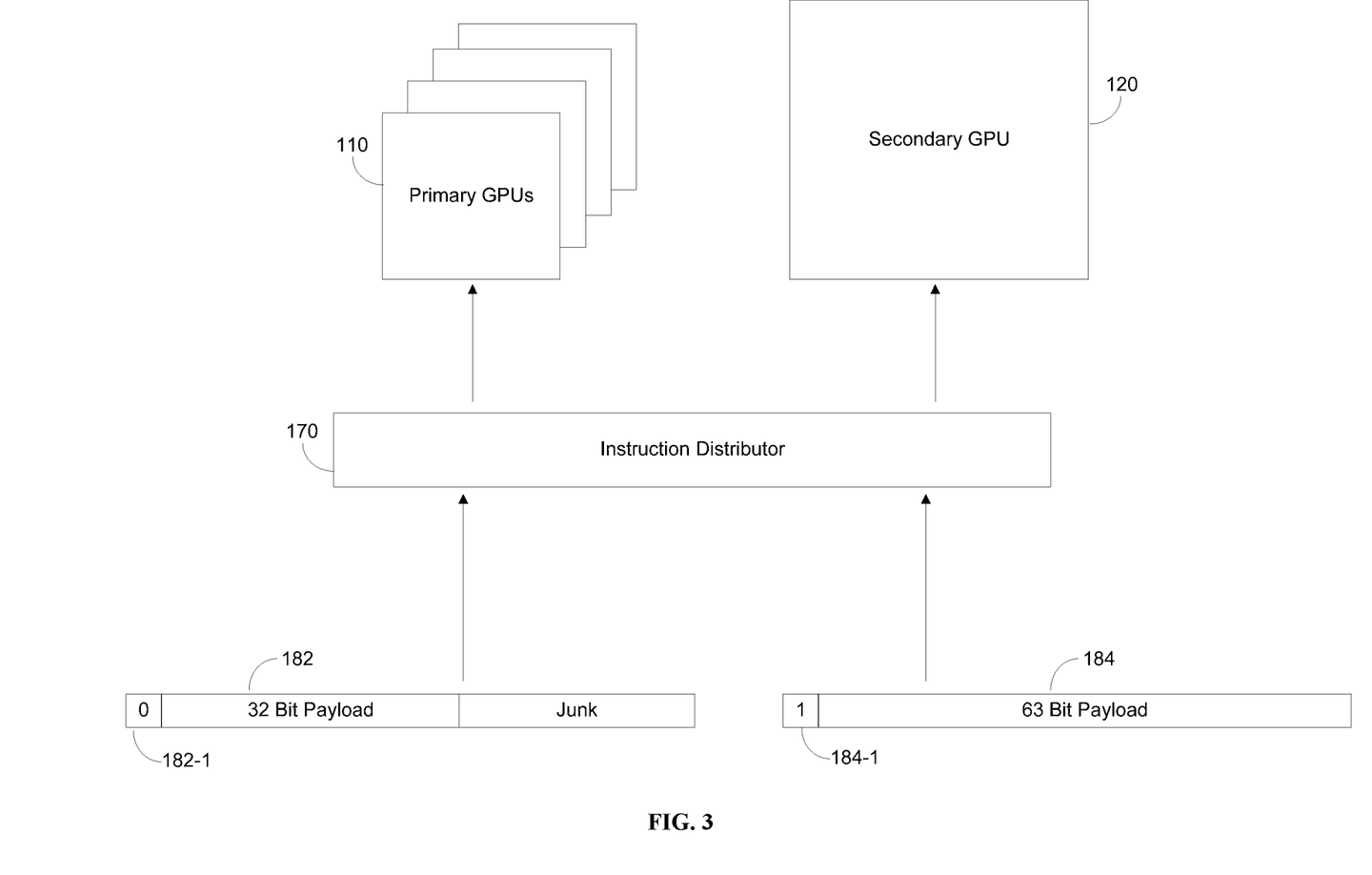
FIG. 3 is a schematic illustration of an asymmetric multi-core HPPS with an instruction distributor, implemented in accordance with an embodiment.

FIG. 3 is an exemplary and non-limiting schematic illustration of an asymmetric multi-core HPPS with an instruction distributor, implemented in accordance with an embodiment. The multi-core HPPS may further include an instruction distributor 170. The instruction distributor 170 distributes instructions of the ISA for execution by the GPUs. The instruction distributor 170 may be hardware based (implemented as circuitry), software based, or a combination thereof. In an embodiment, the instruction distributor 170 directs instructions to the relevant group of processors. For example, the ISA may include 64-bit instructions to be executed by the first group of primary processors 110, the second group of secondary processors 120, or a combination thereof. In this exemplary embodiment, the instruction distributor 170 receives a first instruction 182 and a second instruction 184. The first instruction 182 includes a flag bit 182-1, set to '0'. In an embodiment, the flag bit 182-1 indicates to the instruction distributor that this instruction is preferably executed by the first group of primary GPUs 110. However, in some embodiments the instruction distributor 170 may direct the first instruction 182 to be executed by the second group of secondary GPUs 120 for load balancing purposes. The first instruction may include a 32-bit payload, which is the executable instruction itself, and an additional 31 junk bits which may have no effect on execution. The second instruction 184 includes a flag bit 184-1, set to '1'. In an embodiment, the flag bit 184-1 indicates to the instruction distributor 170 that this instruction should be executed by the second group of secondary GPUs 120. The instruction distributor 170 may not direct the second instruction 184 to be executed by the first group of primary GPUs 110, since they are not capable of executing this instruction, or capable of execution with reduction in quality of service (QoS) in terms of image resolution. The second instruction may include a 63-bit payload, which is the executable instruction itself. In an embodiment, the multi-core HPPS includes a compiler, for transforming source code into instructions which can be executed by a GPU of the first group of primary GPUs or a GPU of the second group of secondary GPUs. In an embodiment the multi-core HPPS may further include a load balancer, implemented for example as a circuit, or as a software module, or as part of the instruction distributor 170. The load balancer may determine that an instruction or a group of instructions which should be executed by a GPU of the first group of primary GPUs will be actually executed by a GPU of the second group of secondary GPUs. This may speed execution at the expense of power, and may be desirable in some embodiments. In some embodiments, the instruction includes a first portion containing instructions for alpha channel operations, a second portion containing instructions for RGB vector operations, a third portion containing memory addressing instructions for performing I/O operations to a memory, and a fourth portion containing branching instructions, which may be based on comparisons between RGB and alpha values. In some embodiments, the first group of primary GPUs and the second group of secondary GPUs may each execute the entire ISA. However, due to the nature of each group of GPUs, results of the execution will differ in quality (with respect to image resolution), or in execution time, or in power consumption. For example, the second instruction 184 may be executed by a primary GPU to achieve a result which is less precise (given the same time), had the second instruction been executed by the secondary GPU 120. In some applications, this may be desirable to sacrifice image quality (or quality of service—QoS) in exchange for longer battery life. For example, upon reaching a predetermined battery charge level threshold, the instruction distributor 170 may be configured to direct all instructions to the primary GPUs 110 in order to reduce power consumption. In another embodiment, optimization of the instruction distributor may be according to the specific instructions. For example, a workload may require 5 instructions if executed on a secondary GPU, but 25 instructions if executed on the primary GPUs 110 to achieve the same result without sacrificing quality of service. In such an example, it may be more power efficient to generate from the workload instructions which can be executed by the secondary GPU. In yet another exemplary embodiment, instructions of the ISA may further include a QoS indicator, including one or more bits. The QoS indicator may be considered by the instruction distributor 170 to determine where an instruction will be sent for execution. For example, high detail graphics may be preferably executed by the secondary GPU 120, which is more precise. However, the instruction distributor 170 may override the QoS indicator in certain embodiments, for example to preserve power, in an application where low resolution (i.e. low precision graphics) for a longer period of time are more desirable than a high resolution (high precision graphics) for a short period of time. As another example, the QoS indicator may be determined based on ambient light conditions to which the display is exposed to. In such an example, the graphic user interface (GUI) may be generated by instructions executed on either group of GPUs. However, if the display is outdoors in bright light, the GUI may be rendered using the first group of GPUs resulting in a less precise GUI, but the reduction in quality may be unnoticeable due to the contrast between the display and the ambient light.

Figure 4:
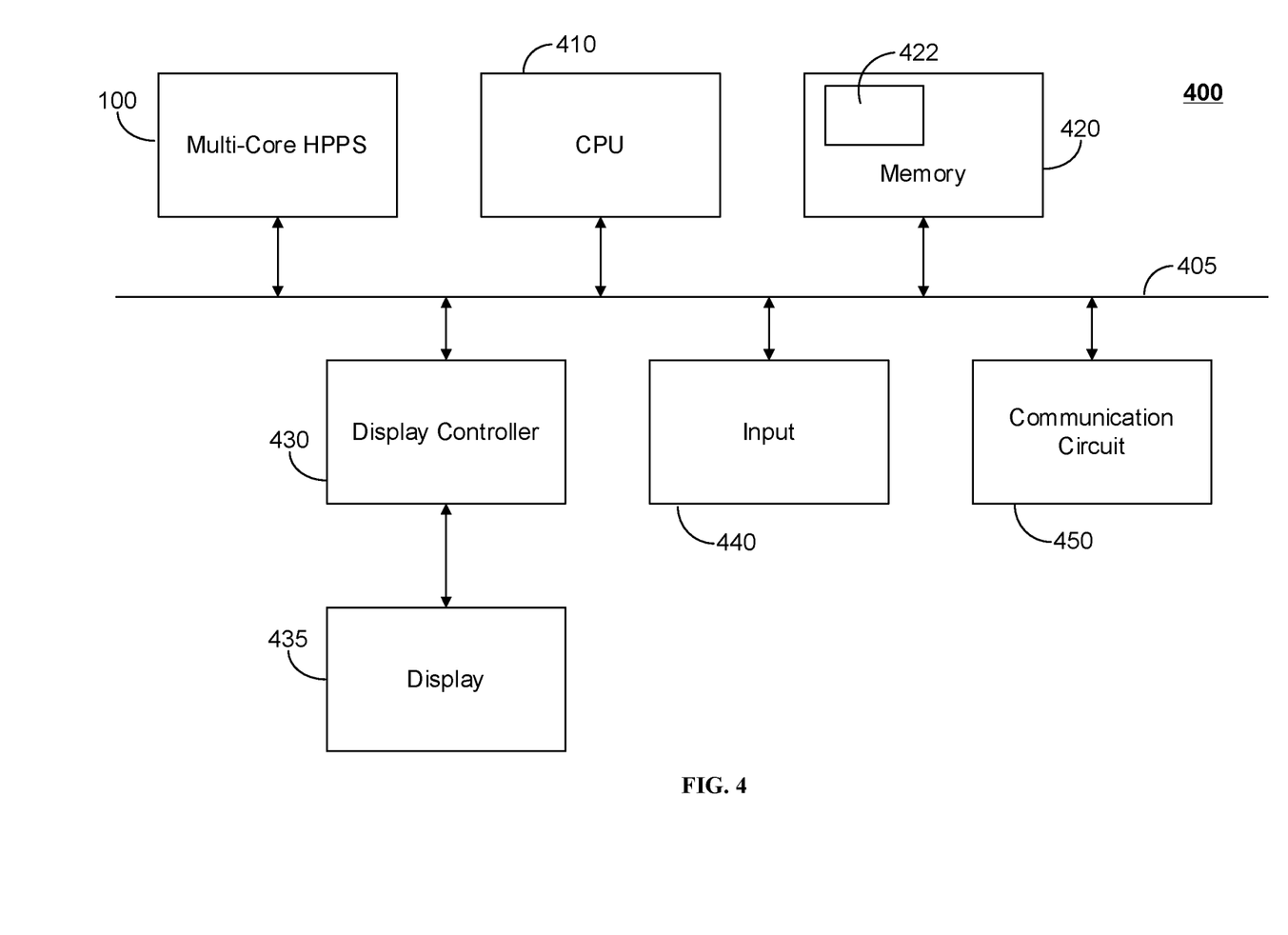
FIG. 4 is a schematic illustration of a system with an asymmetric multi-core HPPS implemented according to an embodiment.

FIG. 4 is an exemplary and non-limiting schematic illustration of a system 400 with an asymmetric multi-core HPPS implemented according to an embodiment. The system 400 includes a multi-core HPPS, such as multi-core HPPS 100. The multi-core HPPS 100 may be additionally connected to a serial processing element, such as a CPU 410, which in turn may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The multi-core HPPS 100 and, in some embodiments the CPU 410, may be operative to receive instructions from an application programming interface (API) layer 415, through a driver 418 (See FIG. 6). The API 415 allows applications to utilize functionalities of the multi-core HPPS 100, by sending API requests to the driver 418. The driver 418 may generate ISA instructions to be executed by one or more cores of the multi-core HPPS 100. The multi-core HPPS 100 is coupled via a bus 405 to a memory 420. The memory 420 may include a memory portion 422 that contains instructions that when executed by the processing element 410, and/or the multi-core HPPS 100 performs the method described in more detail herein. The memory 420 may be further used as a working scratch pad for the multi-core HPPS 100, the processing element 410, a temporary storage, and others, as the case may be. The memory 420 may be a volatile memory such as, but not limited to random access memory (RAM), or non-volatile memory (NVM), such as, but not limited to, Flash memory. The system 400 further includes a display controller (DC) 430. The DC 430 is operative for controlling a display 435. The display 435 may be, for example, an LCD, OLED, and the like. In an embodiment, the display 435 may be a low-power, or ultra-low power display. The system 400 may also include an input 440. The input 440 may be a touchscreen, dial, keyboard, microphone, combinations thereof and the like. The system may also include a communication circuit 450. The communication circuit 450 may be operative to connect the system 400 to a network. In an embodiment, the network may be configured to provide connectivity of various sorts, as may be necessary, including but not limited to, wired and/or wireless connectivity, including, for example, local area network (LAN), wide area network (WAN), low power WAN (LPWAN), metro area network (MAN), worldwide web (WWW), Internet, and any combination thereof, as well as cellular connectivity. The multi-core HPPS 100, the processing element 410 and/or the memory 420 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 5:
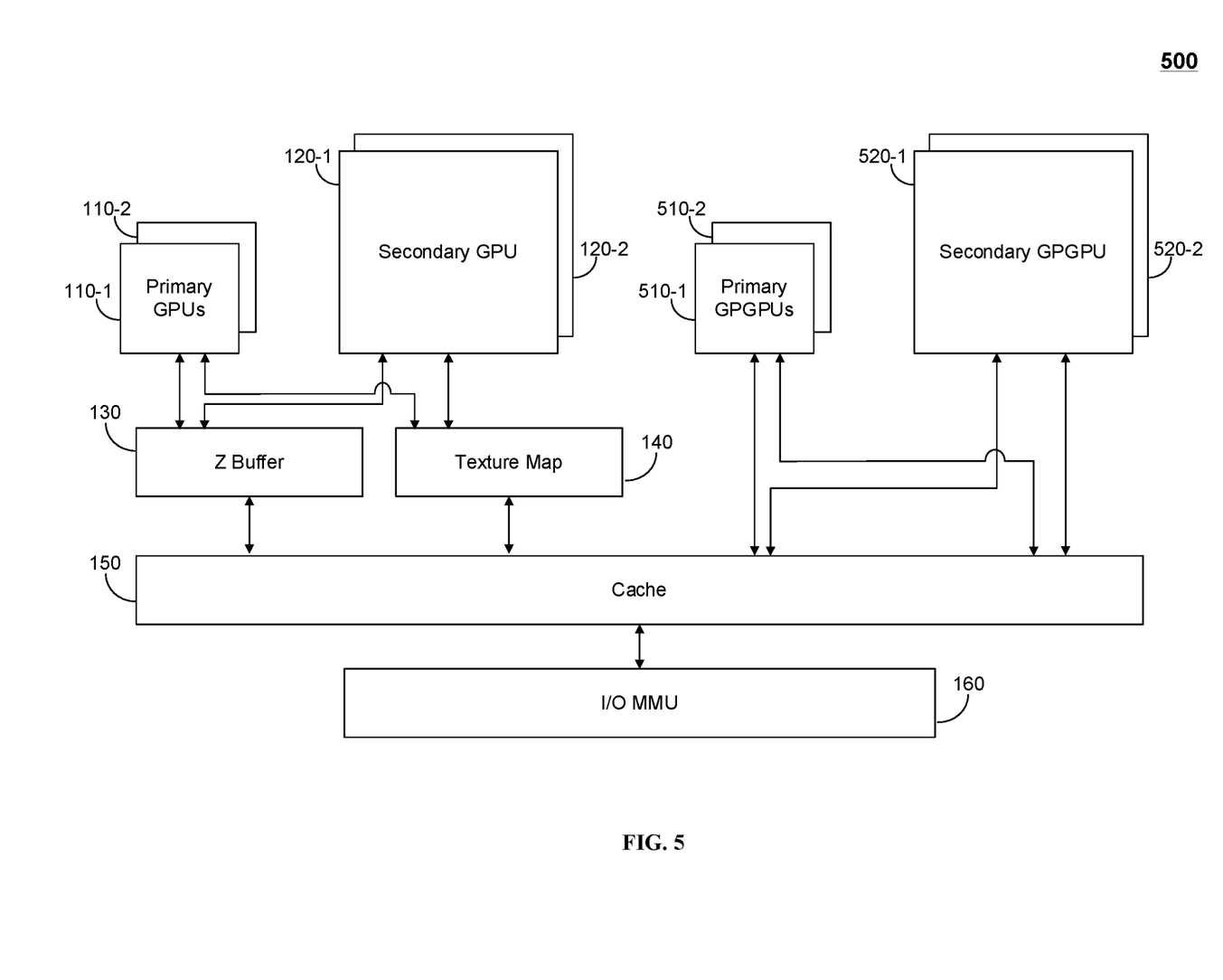
FIG. 5 is a schematic illustration of an asymmetric multi-core heterogeneous parallel processing system, implemented in accordance with yet another embodiment.

FIG. 5 is an exemplary and non-limiting schematic illustration of an asymmetric multi-core heterogeneous parallel processing system 500, implemented in accordance with yet another embodiment. The multi-core heterogeneous parallel processing system (HPPS) 500 includes a first group of homogeneous primary graphic processor units (GPUs) 110-1 and 110-2, generally referenced as first group of GPUs 110, and a second group of secondary GPU 120-1 and 120-2. In an embodiment, the first group of primary GPUs 110 may include one or more primary GPUs, each having a first microarchitecture and a first power consumption profile. A primary GPU 110 may have a fixed point data path, and a first set of instructions of an instruction set architecture (ISA). In an embodiment, the second group of secondary GPUs 120 may include one or more homogeneous secondary GPUs, each having a second microarchitecture and a second power consumption profile. The second power consumption profile is higher than the first power consumption profile, indicating that a GPU of the secondary group consumes more power than a GPU of the primary group. A secondary GPU may have a floating point data path or fixed point data path of higher precision compared primary GPU, and a second set of instructions of the ISA. The second set may include all, or a portion of, the first set of instructions. In an embodiment, the second set may include an instruction set larger than the first set of instructions. The multi-core HPPS further includes a hardware z-buffer 130, coupled to the first group of primary GPUs 110 and the secondary GPU 120. Upon rendering an object, the depth of a generated pixel, equivalent to a z-coordinate, is stored in the z-buffer 130. The multi-core HPPS further includes a texture mapping unit (TMU) 140. The TMU may be a separate processing unit, and may be used to transform a bitmap image to an arbitrary plane of a three-dimensional space. The TMU 140 and the z-buffer 130 are communicatively coupled to a cache 150. The cache 150 is further communicatively coupled to an I/O memory management unit (MMU) 160. The I/O MMU 160 manages the cache, and may perform virtual memory management as needed. The multi-core HPPS 500 further includes a third group of primary general purpose GPUs (GPGPUs) 510-1 and 510-2, generally referenced as third group of GPGPUs 510. In an embodiment the third group of primary GPGPUs 510 may include one or more primary GPGPUs, each having a third microarchitecture and a third power consumption profile. A primary GPGPU 510 may have a fixed point data path, and a first set of instructions of a second ISA. In an embodiment, the third microarchitecture is identical to the first microarchitecture. The multi-core HPPS includes a fourth group of secondary GPGPUs 520-1 and 520-2, generally referenced fourth group of secondary GPGPUs 520. In an embodiment, the fourth group of secondary GPGPUs 520 may include one or more homogeneous secondary GPGPUs, each having a fourth microarchitecture and a fourth power consumption profile. The fourth power consumption profile is higher than the third power consumption profile, indicating that a GPGPU of the fourth group consumes more power than a GPU of the third group. A secondary GPGPU may have a floating point data path, and a second set of instructions of the second ISA. The second set may include all, or a portion of, the first set of instructions of the second ISA. In an embodiment, the second set may include an instruction set larger than the first set of instruction. In some embodiments, the fourth microarchitecture is identical to the second microarchitecture. The third group of primary GPGPUs 510 and the fourth group of secondary GPGPUs 520 are communicatively connected to the cache 150. In certain embodiments, the third group of primary GPGPUs 510 and/or the fourth group of secondary GPGPUs 520 may be communicatively connected to a cache separate from cache 150. In yet another embodiment, more than one cache levels connected hierarchically may be implemented. In some of the exemplary embodiments discussed above, the first group of GPUs (or GPGPUs) and the second group of GPUs (or GPGPUs) are differentiated in utilizing fixed point versus floating point or fixed point with different precision levels. However, in other exemplary embodiments, the difference may be the number of registers, branching behavior, vectorization, pipeline stages, operation frequency, capacity to execute instructions in parallel, multi-threading capabilities, combinations thereof, and the like.

Figure 6:
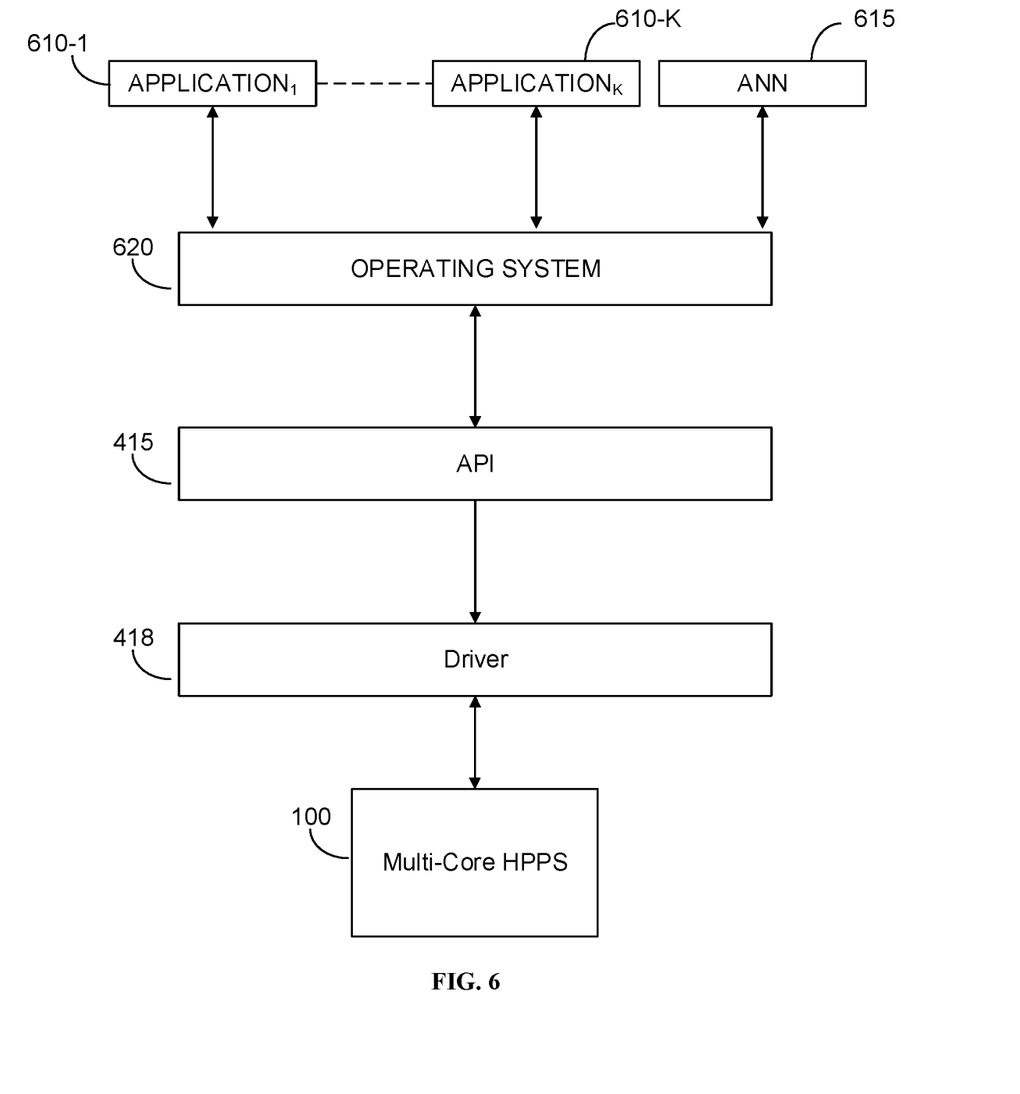
FIG. 6 is a schematic illustration of a layered model for operating a multi-core HPPS, implemented in accordance with an embodiment.

FIG. 6 is a non-limiting exemplary schematic illustration of a layered model for operating a multi-core HPPS, implemented in accordance with an embodiment. A plurality of applications 610-1 through 610-K are executed over an operating system (OS) 620. 'K' is an integer having a value of '1' or greater. It is understood that in some embodiments, a single application may be executed. The OS 620 communicates with an API 415, to send API requests to a driver to generate ISA instructions for a multi-core HPPS 100. A request may be for example to render an object. The request is sent to the driver 418 for generating one or more ISA instructions for the multi-core HPPS to perform the request. In an embodiment, the request may include a rendering preference, indicating which type of processor of the multi-core HPPS should render. In some embodiments, the driver 418 may be configured to override the request, for example due to power conservation. In an embodiment, the driver 418 may be coupled to the instruction distributor and control the operation of the instruction distributor. In another embodiment, the instruction distributor may operate autonomously without being instructed or controlled by the driver 418.

In yet another embodiment, the driver may also control a precision level of the z-Buffer operations generated by the GPU cores of the primary group, or the GPU cores of the secondary group, or both. It is understood that by increasing the precision of the z-Buffer operations, the power consumption might also be increased and vice versa. In another embodiment the driver 418 might also control the precision level and/or the sampling mode of the texture mapping operations generated by the GPU cores of the primary group, or the GPU cores of the secondary group, or both. By decreasing the precision levels of the texture mapping operations, the power consumption of the related arithmetic computations might be reduced. Gains in power consumption might be also realized by controlling the texture sampling mode. For example, point texture sampling typically involves only one access to the texture memory and more complex texture mapping schemes (e.g., bilinear) require more than one accesses to the texture memory. It is understood, that fewer memory accesses results in less power consumption and vice versa. In certain embodiments, the driver 418 might receive as input the display resolution and size. It should be readily understood that rendering an object in a small display size might require computations with limited precision (for example to conserve battery power of a mobile device such as a laptop, tablet, smartwatch, e-reader and the like), or texture sampling computations with limited precision, or texture sampling modes with limited memory accesses, or z-buffer operations with limited precision or a combination thereof. For example, rendering an object in a 3D scene that it is distant from the viewpoint in a small display of an internet of things (IoT) device with lower quality may not be noticed by a user as the human eye may not always perceive such discrepancies. In such cases a gain is achieved without sacrificing something which is readily discernable to a user viewing the display.

In certain embodiments, an artificial neural network (ANN) 615 may be executed as an application on top of the OS 620. An ANN 615 may be, for example, a deep neural network. The ANN 615 may receive feedback from the driver 418 to train the ANN 615. The ANN 615 may receive as an input an object rendered on a primary GPU, the object rendered on a secondary GPU, the size and resolution of the display, the output of one or more cost functions based on the rendered objects, and the like. The ANN 615 may be configured to then determine based on the above on which core of the multi-core HPPS 100 should a new object be rendered, or the precision of the texture computations, or the texture sampling mode, or the precision of the z-Buffer operations or a combination thereof.

Figure 7:
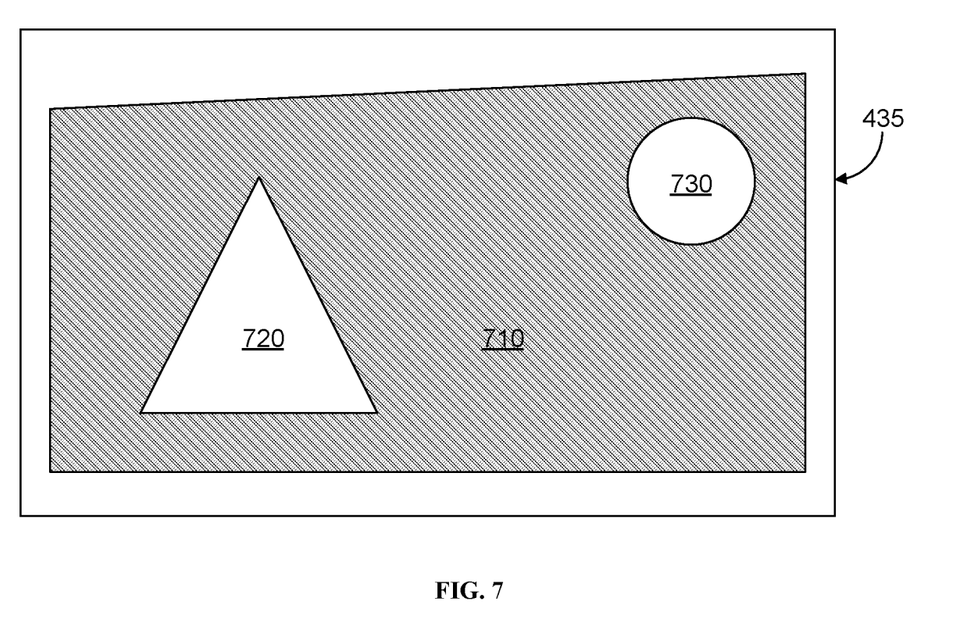
FIG. 7 is a schematic illustration of a display displaying a content aware rendered scene, implemented in accordance with an embodiment.

FIG. 7 is a non-limiting exemplary schematic illustration of a display displaying a content aware rendered scene, implemented in accordance with an embodiment. An application operating above the multi-core HPPS is programmed to request a rendering of a scene on a display 435 including multiple elements: a background image 710, a first polygon 720 and a second polygon 730. The second polygon 730 might be distant relative to the viewpoint. An API, such as API 415, between the multi-core HPPS and the application may configure the multi-core HPPS to render the scene. In some embodiments, the application may specify through the API, for example with an indicator bit, which element to render on what type of processor, the precision of the z-buffer operations, and the precision and type of the texture operations. For example, the application may indicate that the background element 710 should be rendered on a primary GPU, the first polygon 720 and the second polygon 730 should be rendered on a secondary GPU. The API may generate instructions for an instruction distributor 170 which distributes instructions of the ISA for execution by the GPUs. In some embodiments, the multi-core HPPS may detect, for example through z-testing, that a certain element is changing coordinates (i.e. moving) on the display at a rate higher than a threshold rate, which may be determined for example, based on a ratio between the size of the object and the size of the display. In response to such detection, the multi-core HPPS may indicate to the application via the API to send instructions to render the certain element in a GPU having a lower precision. The loss in precision may be perceived as minimal especially as the gains in power consumption may be significant. In some embodiments, the GPU cores may determine a color difference between a first rendered object and a second rendered object. If the color difference is determined to be below a threshold value, the API may instruct the multi-core GPU to render the first rendered object and/or the second rendered object on the primary processor cores, in order to conserve power. The loss in precision may not be noticed by a user of the display on which the objects are rendered, as the human eye may not always perceive such discrepancies. In other embodiments, the API (or application) may detect a number of frames per second (fps) of a rendered object. The API may then generate ISA instructions to render on the primary group of GPU cores and configure the precision z-buffer and texture operations if the number of fps exceeds a first threshold. The API may generate an ISA instruction to be executed on the secondary group of GPU cores if the number of fps is less than a second threshold. In some embodiments, the application (or API) determines a computational complexity of a rendered first object. The application may generate ISA instructions to render the first object by the secondary group of GPU cores, in response to the complexity exceeding a first threshold. The application may generate ISA instructions to render the first object by the primary group of GPU cores, in response to the complexity being less than a second threshold. Complexity may be determined based on a number of lines of code required to render the first object. In some embodiments, instructions may be further generated based on a light sensor communicatively coupled with the multi-core HPPS. For example, if it is determined that the light conditions are such that an object rendered at a first resolution will be perceived by a human eye without a significant difference than the same object rendered at a second, lower, resolution, then the instructions may be generated to render the object using the second resolution, leading to use of less computational power. In some embodiments, where the application determines that an object is distant relative to the viewpoint of the display, the application may instruct to render the object with less precision, using any of the techniques disclosed herein.

Throughout this disclosure the terms 'heterogeneous' and 'homogeneous' are used in context of GPU cores. Two GPU cores are considered homogeneous in that they share a microarchitecture, and an ISA. In some embodiments, homogeneous GPU cores may be differentiated by, for example, pipeline stages, cache, and/or operation frequency. Two GPU cores may be considered heterogeneous when they share a baseline ISA, and at least one GPU core has a unique instruction, and they may further be differentiated by microarchitecture.

While the examples above deal in two groups of GPU cores, it should be readily apparent that any number of different groups may be used, as long as at least two groups have a shared ISA.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), GPUs, GPGPUs, combinations thereof, a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. An asymmetric multi-core heterogeneous graphics processing unit (GPU), comprising:
   a first group of GPU cores each having a first microarchitecture and a first power consumption profile, wherein the first group of GPU cores is configured to execute a first subset of an entire instruction set architecture (ISA);
   a second group of GPU cores each having a second microarchitecture and a second power consumption profile higher than the first power consumption profile, wherein the second group of GPU cores is configured to execute the entire ISA;
   a controller connected to the first group of GPU cores and the second group of GPU cores, wherein the controller is configured to receive, an ISA instruction of the ISA and determine whether the instruction should be executed by the first group of GPUs, or by the second group of GPUs; and
   wherein the ISA instruction is generated by an application programming interface (API), the API allowing an application to request the ISA instruction to be executed on the first group of GPU cores, or the second group of GPU cores, wherein the first group of GPU cores is distinct from the second group of GPU cores; and wherein the application determines a computational complexity of a rendered first object and generates ISA instructions to render the first object by the second group of GPU cores, and the second group of GPU cores is further configured to render the first object when the computational complexity rendering of the first object exceeds a first threshold in response to ISA instructions generated by the application.

2. The multi-core GPU of claim 1, wherein the multi-core heterogeneous GPU further comprises a memory, having stored therein instructions that when executed by the multi-core GPU configure a system to:
   determine a color difference between a first rendered object and a second rendered object; and
   render at least one of the first rendered object and the second rendered object on the first group of the GPU cores, in response to determining the color difference to be below a threshold value.

3. The multi-core GPU of claim 2, wherein the first group of GPU cores is further configured to render the second rendered object when the computational complexity is less than a second threshold.

4. The multi-core GPU of claim 3, wherein computational complexity is determined based on a number of lines of code required to render the first object.

5. The multi-core GPU of claim 1, wherein the multi-core GPU further comprises a memory, having stored therein instructions that when executed by the multi-core heterogeneous GPU configure a system to:
   determine a number of frames per second (fps) of a rendered object, wherein the controller is further configured to determine that the ISA instruction should be rendered on the first group of GPU cores if the number of fps exceeds a first threshold.

6. The multi-core GPU of claim 5, wherein the controller is further configured to determine that the instruction should be rendered on the second group of GPU cores if the number of fps is less than a second threshold.

7. The multi-core GPU of claim 1, wherein the multi-core GPU further comprises a memory, having stored therein instructions that when executed by the multi-core heterogeneous GPU configure a system to:
   determine a rate of movement of a rendered object, based on associated xy coordinates of tiles of the object; and
   determine that rendering instructions should be executed on the first group of GPU cores if the rate of movement exceeds a first threshold.

8. The multi-core GPU of claim 7, wherein the multi-core heterogeneous GPU further comprises a memory, having stored therein instructions that when executed by the multi-core GPU configure a system to:
   determine that rendering instructions should be executed on the second group of GPU cores if the rate of movement is below a second threshold.

9. The multi-core GPU of claim 1, wherein the application determines generating the ISA instruction based on: a detected display size, a detected display type, or a combination thereof.

10. The multi-core GPU of claim 9, wherein the detected display size or the detected display type, or a combination thereof, is below a predetermined threshold, and the application determines to generate an ISA instruction on the first group of GPU cores.

11. The multi-core GPU of claim 1, wherein a z-buffer is coupled with: the first group of GPU cores, the second group of GPU cores, a subset of GPU cores of the first group of GPU cores, or a subset of the GPU cores of the second group of GPU cores.

12. The multi-core GPU of claim 11, wherein the precision of the z-buffer is adjustable based on a bit allocation.

13. The multi-core GPU of claim 12, wherein a GPU core of the first group of GPU cores is coupled with a z-buffer having a first precision, wherein a GPU core of the second group of GPU cores is communicatively coupled with a z-buffer having a second precision, and wherein the first precision is different from the second precision.

14. The multi-core GPU of claim 1, wherein a GPU core of the first group of GPU cores is communicatively coupled with a first texture mapping unit (TMU) and a GPU core of the second group of GPU cores is communicatively coupled with a second TMU.

15. The multi-core GPU of claim 14, wherein the first TMU has a first precision, and the second TMU has a second precision which is different from the first precision.

16. The multi-core GPU of claim 14, wherein the first TMU or the second TMU receives as an input: a precision level based on a predetermined number of bits of computation, a texture sampling mode, or a combination thereof.

17. The multi-core GPU of claim 14, wherein the first TMU is configured to perform point texture sampling.

18. The multi-core GPU of claim 14, wherein the second TMU is configured to perform bilinear texture sampling.

* * * * *